United States Patent [19]

Kim

[11] Patent Number: 5,566,035
[45] Date of Patent: Oct. 15, 1996

[54] DEVICE FOR DRIVING IDLER OF DECK MECHANISM OF VIDEO CASSETTE RECORDER

[75] Inventor: Tae H. Kim, Seoul, Rep. of Korea

[73] Assignee: Goldstar Co., Ltd., Seoul, Rep. of Korea

[21] Appl. No.: 321,477

[22] Filed: Oct. 11, 1994

Related U.S. Application Data

[63] Continuation of Ser. No. 117,616, Sep. 8, 1993, abandoned.

[30] Foreign Application Priority Data

Sep. 8, 1992 [KR] Rep. of Korea .................. 16395/1992

[51] Int. Cl.$^6$ .................................................. G11B 15/44
[52] U.S. Cl. ............................................................. 360/85
[58] Field of Search ........................... 360/85, 96.3, 96.4, 360/96.1; 242/200, 201, 356, 356.7

[56] References Cited

U.S. PATENT DOCUMENTS 4,912,578  3/1990  Katohno et al. ........................... 360/85
5,003,418  3/1991  Yang ........................................ 360/96.4
5,251,845  10/1993  Ryu ........................................... 242/201

Primary Examiner—Roberts S. Tupper
Assistant Examiner—William R. Korzuch

[57] ABSTRACT

A device for driving an idler of a deck mechanism of a video cassette recorder. This device comprises a tape supply reel and a tape take-up reel, both reels being rotatably mounted on a base plate of the deck mechanism and rotated by a rotational force of a capstan motor, a function plate linearly reciprocating by a rotational force of a loading motor, a gear pulley applied with the rotational force of the capstan shaft through a belt, a transmission gear assembly driving the idler by the rotational force of the gear pulley to rotate either of the tape supply reel or the tape take-up reel, and a turning member rotating, in cooperation with the function member, the second transmission gears to cause the idler to gear into either of the tape supply reel and the tape take-up reel prior to transmission of the rotational force of the capstan shaft to the reel gearing into the idler. The gear assembly comprises a clutch assembly including upper and lower clutch gears and an operating gear fixedly coupled to the transmission clutch gear. The turning member is provided with a gear section, gearing into the operating gear, and with a guide slit slidably receiving a connection pin of the function member.

8 Claims, 5 Drawing Sheets over# DEVICE FOR DRIVING IDLER OF DECK MECHANISM OF VIDEO CASSETTE RECORDER

This application is a continuation, of application Ser. No. 08/117,616 filed on Sep. 8, 1993, now abandoned.

BACKGROUND OF THE INVENTION

1. Field of the Invention

The present invention relates in general to a deck mechanism of a video cassette recorder having a jog shuttle function for achieving a desired speed change while continuing the contact of a pinch roller with a capstan shaft in the case of a mode conversion from a PLAY mode to a CUE mode or to a REV mode, and more particularly to a device for driving an idler of the deck mechanism, the idler transmitting a rotational force of the capstan shaft to either of a tape supply reel or a tape take-up reel.

2. Description of the Prior Art

With reference to FIG. 1, there is shown in a schematic plan view a conventional deck mechanism of a video cassette recorder (VCR) having the aforementioned jog shuttle function.

In this drawing, the reference numeral 1 denotes a rotary head drum, 2 and 3 denote a tape supply reel and a tape take-up reel, respectively, 4 and 5 denote a capstan shaft and a pinch roller, respectively, 6 denotes a gear pulley, 7 denotes a belt, 8 and 9 denote a F/R (fast forward/rewind) gear and an up/down gear, respectively, 10 denotes a clutch assembly, 11 denotes an idler or an idle gear, and 12 and 13 denote first and second connection gears, respectively.

In the conventional deck mechanism of the VCR having the jog shuttle function, movement of one frame picture in a direction of "CUE→REV" or movement of one frame picture in a direction of "REV→CUE", both movements being carried out using a jog dial (not shown), generally causes a picture noise.

If described in detail, the pinch roller 5 during the play mode closely contacts with the capstan shaft 4 which is rotated in the counterclockwise direction of FIG. 1, thus to cause the tape T to run in a direction shown at the arrow B of the drawing.

At this time, when the take-up reel 3 can not tightly and completely take up the tape T, this tape T may sag about a lower periphery of the rotary head drum 1 as shown at the dash and dot line of FIG. 1. This sag of the tape T about the head drum 1 results in the picture noise.

The capstan shaft 4 makes the tape T momentarily run in the direction of the arrow B' of FIG. 1 in practical use of the jog shuttle VCR as described above. However, in order to take up the tape T, the rotational force of the capstan shaft 4 should be transmitted to the take-up reel 3 in order of the capstan shaft 4→the belt 7→the gear pulley 6→the F/R gear 8→the clutch assembly 10→the up/down gear 9→the idle gear placed on the position 11'→the take-up reel 3. On the other hand, in order to rotate the supply reel 2 to take up the tape T thereby, the rotational force of the capstan shaft 4 should be transmitted to the supply reel 2 in order of the idle gear shifted from the dotted position 11'to the solid position 11→the first connection gear 12→the second connection gear 13→the supply reel 2. It is thus noted that there is a timing interval between the tape running by the capstan shaft 4 and the reel rotation since it is not until the rotational force of the capstan shaft 4 is transmitted to the take-up reel 3 or to the supply reel 2 that the reel is rotated. Such a timing interval causes the noise to appear on the picture.

One approach to prevent such a picture noise caused by the timing interval is to use an additional force other than the rotational force of the capstan shaft 4 to rotate the supply reel 2 or the take-up reel 3. A known structure for rotating reel 2 by the additional force is shown in FIGS. 2 to 4. As shown in FIGS. 2 and 3, the known supply reel drive structure includes a hinge pin 15 which is mounted on a lower surface of a base plate 14. A turning lever 16 having a gear section 16a is rotatably coupled to the hinge about pin 15. This turning lever 16 is biased counterclockwise about the pin 15 by a tension coil spring 17 and, at the same time, cooperates with a function plate 18. The gear section 16a of the turning lever 16 selectively gears, in cooperation with the function plate 18, into a lower gear 19 of the supply reel 2.

The gear section 16a of the turning lever 16 as well as the lower gear 19 of the supply reel 2 has a frictional clutch structure of the ratchet type and transmits the additional force in a unidirection, or in the counterclockwise direction of the lower gear 19.

In the drawings, the reference numerals 20 and 21 denote a felt and a compression coil spring, respectively.

In operation of the above supply reel drive structure, when the jog dial is rotated in "CUE→REV" direction in the play mode of the deck mechanism, a loading motor is rotated to make the deck mechanism achieve a REV-SLOW mode. At this time, the function plate 18 linearly moves in a direction shown at the arrow C of FIGS. 2 and 3.

The function plate 18, linearly moving in the direction of the arrow C, pushes the turning lever 16 such that this turning lever 16 turned clockwise about the hinge pin 15. In accordance with such a turning operation of the lever 16, the gear section 16a of the turning lever 16 forcibly rotates the lower gear 19 of the supply reel 2 counterclockwise Here, the felt 20 is tightly interposed between the lower gear 19 and the supply reel 2, so that the rotational force of the lower gear 19 is transmitted to the supply reel 2 through the felt 20 to rotate this supply reel 2, thus to cause the supply reel 2 to take up the tape T. At the same time, the clockwise rotation of the capstan shaft 4 causes the tape T to run in the direction of the arrow B'of FIG. 1. The idle gear 11 driven by the rotational force of the capstan shaft 4 is separated from the take-up reel 3 and gears into the first connection gear 12 and this makes the supply reel 2 rotate by the rotational force of the capstan shaft 4, thus achieving the desired REV-SLOW mode of the deck mechanism.

On the contrary, when the jog dial is rotated in the "REV→CUE" direction, the loading motor is rotated to make the deck mechanism achieve a CUE-SLOW mode. At this time, the function plate 18 linearly moves in a direction opposed to the direction of the arrow C. Such a movement of the function plate 18 causes the turning lever 16 to be free from the interference with the function plate 18, so that this turning lever 16 is turned counterclockwise about the hinge pin 15 due to the restoring force of the tension coil spring 17. The gear section 16a of the turning lever 16 is thus disengaged from the lower gear 19 of the supply reel 2.

At this time, the capstan shaft 4 is rotated in a counterclockwise direction to make the tape T run in the direction of the arrow B. The idle gear 11' connected to a capstan motor is separated from the first connection gear 12 and gears into the take-up reel 3 and this makes the take-up reel 3 rotate clockwise. Hence, the desired CUE-SLOW mode of the deck mechanism is achieved.

As described above, when the jog dial is rotated in the CUE→REV direction or in the REV→CUE direction, one frame picture moves in the reversed direction or in the forward direction.

However, in the deck mechanism having the above structure for rotating the supply reel by the additional force, the supply reel should have a two-stepped gear clutch type structure thus to result in 3 designing problem caused by a high height of the supply reel structure. Such a supply reel structure having the high height also causes an increase of manufacturing cost.

In addition, in order to make the supply reel 2 be not affected by additional force when the jog shuttle is rotated in the REV→CUE direction to achieve the CUE-SLOW mode of the deck mechanism, the lower gear 19 of the supply reel 2 as well as the gear section 16a of the turning lever 16 has the ratchet gear profile. However, in order to completely achieve the above object, it is required to catch the supply reel 2 by an additional brake and the clutch should generate a slip and, at the same time, the teeth of the ratchet gears of the lower gear 19 and of the gear section 16a should go wrong with each other. In this regard, the supply reel 2 is inevitably affected by the turning lever 16 which is rotated counterclockwise by the restoring force of the tension coil spring 17 to return to its initial position. Thus, when the jog shuttle is rotated in the REV→CUE direction to achieve the CUE-SLOW mode, the supply reel 2 supplies the tape T in advance and this causes a noise to momentarily appear on the picture.

Furthermore, the above deck mechanism introduces a difficulty caused by necessity of coincidence of the timing for starting the capstan motor with the timing for starting the loading motor, thus to be restricted from mass production. A continuous repeat of the CUE→REV operation and the REV→CUE operation causes increase of the tensile force of the tape T. Such an increase of the tensile force of the tape T results in excessively close contact of the tape T with the rotary head drum 1, thus to cause generation of the picture noise, increase of a sound noise, and damage of the tape T which results in deterioration of the picture quality.

SUMMARY OF THE INVENTION

It is, therefore, an object of the present invention to provide an idler drive device of a video cassette recorder suitable for prevention of a noise appearing on a picture in a jog shuttle operation.

In order to accomplish the above object, the present invention provides a device for driving an idler of a deck mechanism of a video cassette recorder comprising a tape supply reel and a tape take-up reel, both reels being rotatably mounted on a base plate of the deck mechanism; a function member linearly reciprocating by a rotational force rotational force of a capstan shaft through a belt; second transmission gears driving the idler by tie rotational force of the first transmission gear to rotate either of the tape supply reel or the tap take-up reel and a turning member rotating, in cooperation with the function member, the second transmission gears to cause the idler to gear into either of the tape supply reel or the tape take-up reel prior to transmission of the rotational force of the capstan shaft to the reel gearing into the idler.

The second transmission gears comprise a clutch assembly including a clutch gear applied with the rotational force of the first transmission gear, and a transmission clutch gear causing the idler to gear into either of the tape supply reel and the tape take-up reel. These second transmission gears further include an operating gear fixedly coupled to the transmission clutch gear of the clutch assembly.

The turning member is provided at a side thereof with a gear section gearing into the operating gear and at the other side thereof with a guide slit having a predetermined length, the guide slit slidably receiving a connection pin provided at a predetermined portion of the function member such that the connection pin slides along the guide slit in accordance with the linear reciprocation of the function plate.

BRIEF DESCRIPTION OF THE DRAWINGS

The above and other objects, features and other advantages of the present invention will be more clearly understood from the following detailed description taken in conjunction with the accompanying drawings, in which:

FIGS. 6A to 6C are bottom views of the idler drive device of the present invention, respectively, in which:

FIG. 6A shows a total structure of the device;

FIG. 6B shows a tension member of the gearing into an operating gear of the device; and FIG. 6C shows the tension member disengaging from the operating gear.

DESCRIPTION OF THE PREFERRED EMBODIMENTS

Figure 5:
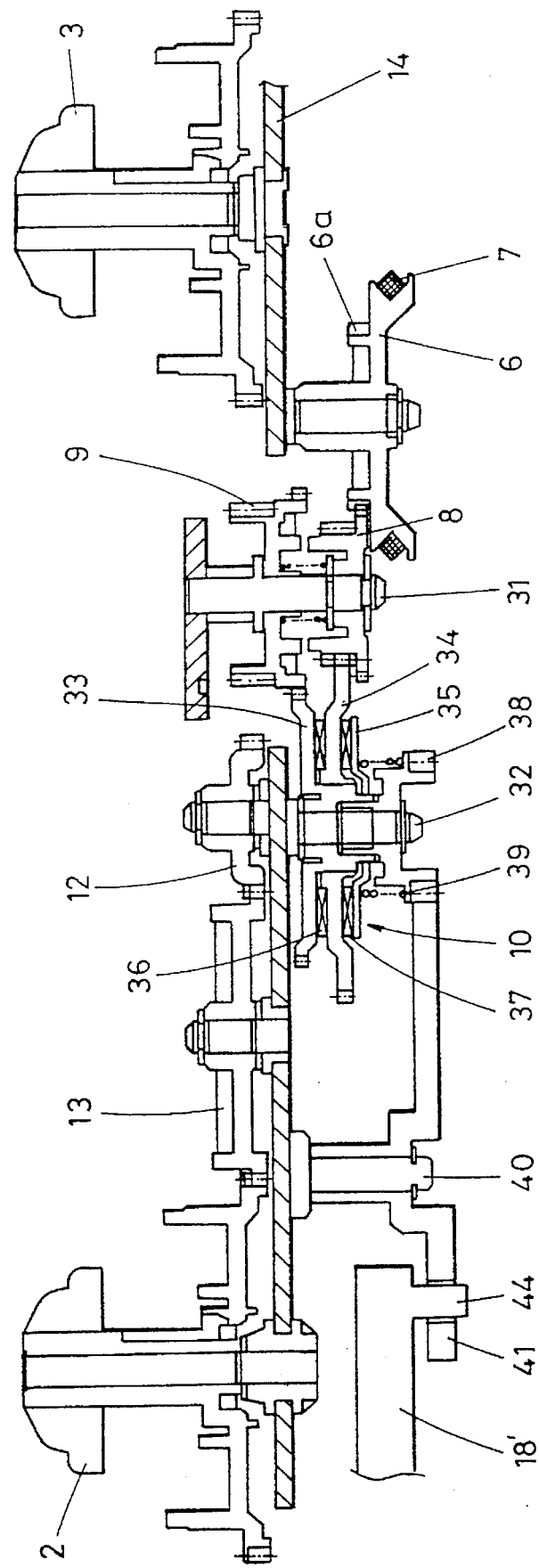
FIG. 5 is a sectional view of a deck mechanism of a VCR having an idler drive device in accordance with an embodiment of the present invention.
Figure 6A:
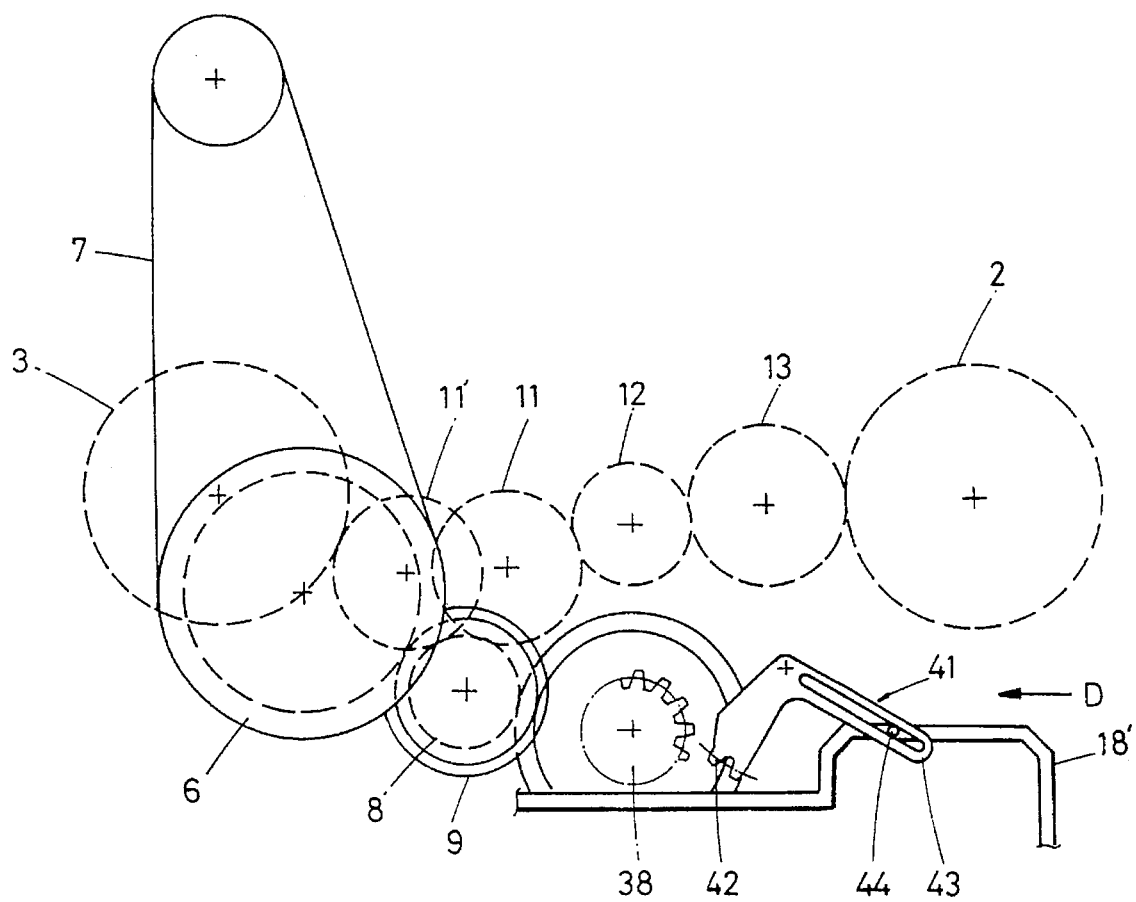
Figure 6B:
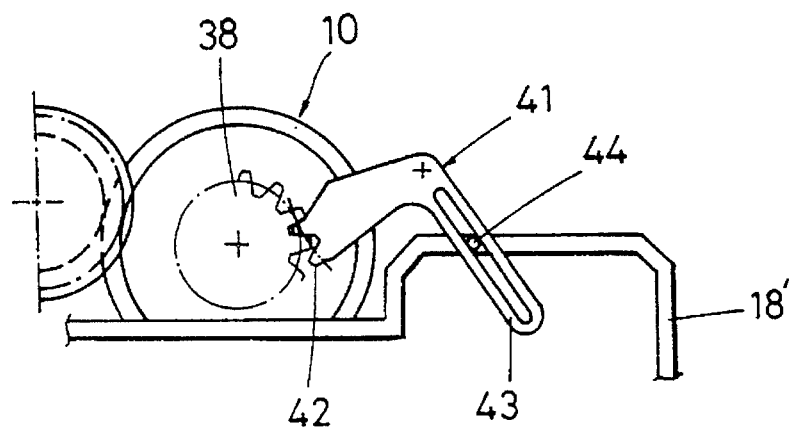
Figure 6C:
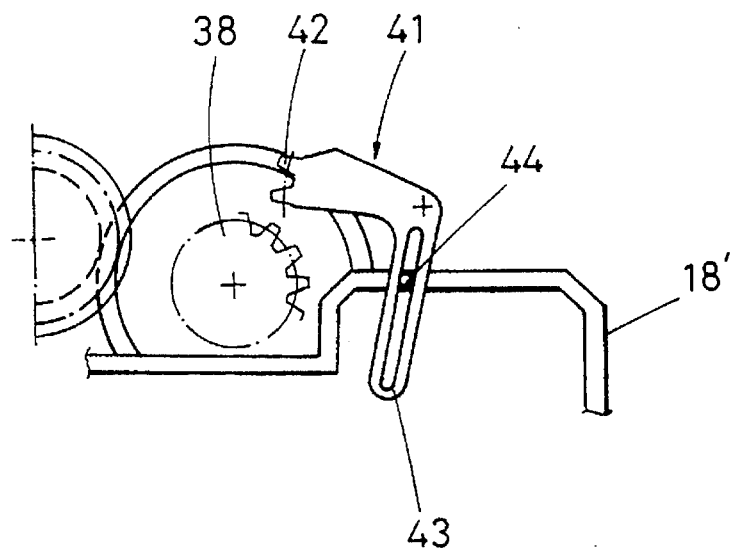

FIG. 5 is a sectional view of a deck mechanism of a VCR having an idler drive device in accordance with an embodiment of the present invention, and FIGS. 6A to 6C are bottom views of the idler drive device, respectively.

As shown in FIG. 5, the deck mechanism of the VCR comprises a supply reel 2 and a take-up reel 3 which are rotatably mounted on both sides of an upper surface of a base plate 14. A pair of connection gears, that is, a first connection gear 12 and a second connection gear 13 are rotatably mounted on the surface of the base plate 14 between the two reels 2 and 3 such that the first gear 12 gears into the second gear 13 which in turn gears into the supply reel 2

A gear pulley 6 is rotatably mounted on a side of a lower surface of the base plate 14 and connected to a capstan shaft 4 by a belt 7, thus to be applied with the rotational force of the capstan shaft 4.

At a side of the gear pulley 6, a smaller diameter F/R gear 8 and a larger diameter up/down gear 9 are rotatably mounted on a common shaft 31. Here, the F/R gear 8 gears into a gear section 6a of the gear pulley 6.

The deck mechanism also includes a clutch assembly 10 mounted on a shaft 32 provided on the other side of the lower surface of the base plate 14. This clutch assembly 10 comprises an upper clutch gear 33 and a lower clutch gear 34, which gear into the up/down gear 9 and the F/R gear 8, respectively. A support plate 35 is coupled to a lower section of the shaft 32. The clutch assembly further comprises a pair of felts 36 and 37 which are interposed between the upper and lower clutch gears 33 and 34 and between the lower clutch gear 34 and the support plate 35, respectively.

In accordance with the present invention, the deck mechanism having the above conventional construction also includes the idler drive device. The idler drive device comprises an operating gear 38 which is fixedly coupled to the upper clutch gear 33 of the clutch assembly 10. A compression coil spring 39 is interposed between the support plate 35 of the clutch assembly 10 and the operating gear 38. The idler drive device also comprises a turning member 41 which is rotatably coupled to a stationary shaft 40, the shaft 40 being fixed to the lower surface of the base plate 14 at a side of the operating gear 38. This turning member 41 cooperates with a function plate 18' to rotate the operating gear 38.

As shown in FIGS. 6a to 6c, the turning member 41 having an L-shaped profile is provided at an end thereof with a gear section 42 gearing into the operating gear 38 and at its linear section with a longitudinal guide slit 43 having a predetermined length. This guide slit 43 slidably receives a connection pin 44 which is provided at a predetermined portion of the function plate 18' such that the pin 44 slides along the guide slit 43 in accordance with the linear reciprocation of the function plate 18'.

Hereinbelow, the operational effect of the idler drive device having the above construction will be given.

Figure 1:
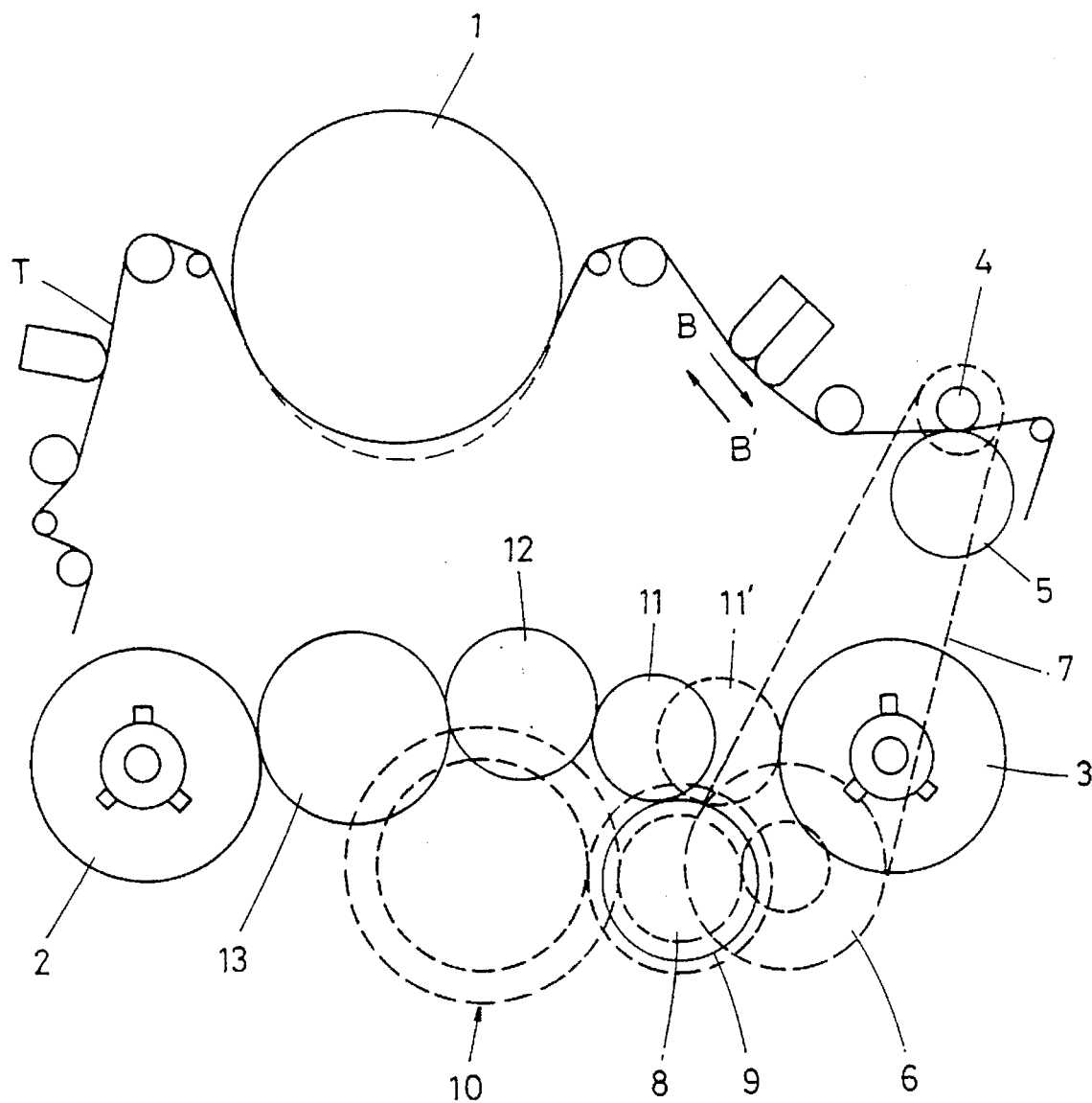
FIG. 1 is a schematic plan view of a conventional deck mechanism of a video cassette recorder (VCR) having a jog shuttle function.
Figure 2:
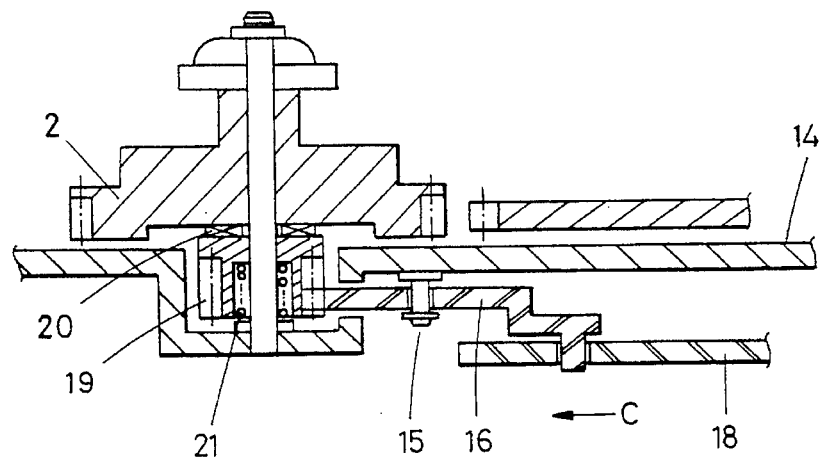
FIG. 2 is a sectional view of a known structure for rotating a supply reel of the conventional deck mechanism by an additional force other than the rotational force of a capstan shaft.
Figure 3:
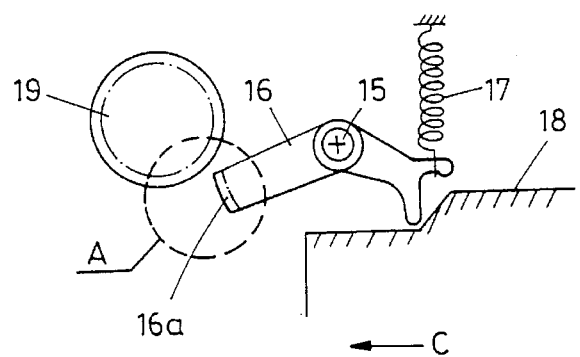
FIG. 3 is a schematic plan view of the structure of FIG. 2 for showing an interrelation between a lower gear of the supply reel and a turning lever cooperating with a function plate.
Figure 4:
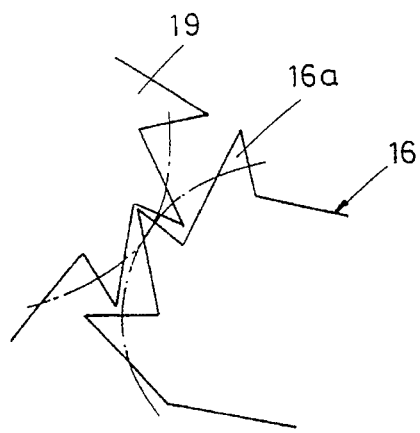
FIG. 4 is an enlarged view of the encircled portion A of FIG. 3 for showing the gearing of ratchet gears of the lower gear and of the turning lever.

In the play mode of the deck mechanism as shown in FIG. 1, the capstan shaft 4 is rotated in the counterclockwise direction to make the tape T run in the direction of the arrow B. At this time, the take-up reel 3 takes up the tape T running in the direction of the arrow B.

When the jog dial is rotated in the "CUE→REV" direction at the above play model the capstan motor momentarily stops its rotation while the loading motor is initially rotated to achieve the REV-SLOW mode of the deck mechanism.

Otherwise stated, in the CUE→REV operation of the jog shuttle, the function plate 18', which linearly reciprocates by the rotational force of the loading motor, moves in a direction shown at the arrow D of FIG. 6A. Such a linear movement of the function plate 18' causes the turning member 41, of which the guide slit 43 slidably receives the connection pin 44 of the function plate 18', to gradually turn clockwise about the shaft 40. As a result, the gear section 42 of the turning member 41 gears into the operating gear 38 and causes this operating gear 38 to be rotated counterclockwise about the shaft 32. At the same time of the counterclockwise rotation of the operating gear 38, the upper clutch gear 33 of the clutch assembly 10 fixedly coupled to the operating gear 38 is also rotated in the same direction.

The up/down gear 9 gearing into the upper clutch gear 33 is thus rotated in the clockwise direction about the shaft 31 and in turn causes the idle gear 11 gearing into the up/down gear 9 to move in the rightward direction of the drawing. Therefore, the idle gear 11 completely gears into the first connection gear 12. The aforementioned movement of the elements by the rotational force of the loading motor is stopped at a time when the backlash between the gears is completely removed.

Here, it should be noted that the intrinsic advantage of this invention is characterized as follows. First, the operating gear 33, which is rotated by the gear section 42 of the turning member 41 turned by the rotational force of the loading motor, does not rotate the supply reel 2 but is rotated at such a rotating angle that the rotation of the gear 38 causes the idle gear to move from the position 11' to the position 11 and that achieves removing of the backlash between the gears generated in a previous operation. Second, since when the operating gear 38 is rotated together with the upper clutch gear 33 of the clutch assembly 10, the lower clutch gear 34 of the assembly 10 is not affected by the rotation of the upper clutch gear 33, due to the presence of the felt 36 interposed between the clutch gears 33 and 34, thus to impart no bad affect by the rotation of upper clutch gear 33 upon the capstan motor.

When the elements of the deck mechanism completely achieve, the rotational force of the loading motor, their positions for carrying out the desired REV-SLOW mode, the capstan shaft 4 is rotated clockwise to make the tape T run in the direction of the arrow B' of FIG. 1. At the same time of the clockwise rotation of the capstan shaft 4, the supply reel 2 is rotated to take up the tape T since the idle gear connected to the capstan shaft 4 has been shifted from the position 11' to the position 11 as described above. Hence, the desired REV-SLOW operation of one frame picture is achieved with no noise appearing on the picture.

When the jog dial is operated in the "REV→CUE" direction at the above state, there is no problem in achieving the desired CUE-SLOW mode of the deck mechanism.

That is, the "REV→CUE" directional operation of the jog dial causes the loading motor to be rotated in a direction, which is opposed to that described for the "CUE→REV" directional operation of the jog dial, under the condition that the capstan shaft 4 stops its rotation. As a result of such a rotation of the loading motor, the function plate 18' linearly moves in a direction opposed to that shown at the arrow D of FIG. 6A. Such a linear movement of the function plate 18' causes the turning member 41 to gradually turn counterclockwise about the shaft 40. As a result, the gear section 42 of the turning member 41 gears into the operating gear 38 and causes this operating gear 38 to be rotated clockwise about the shaft 32. At the same time of the clockwise rotation of the operating gear 38, the upper clutch gear 33 of the clutch assembly 10 fixedly coupled to the operating gear 38 is also rotated in the same direction. The up/down gear 9 gearing into the upper clutch gear 33 is thus rotated in the counterclockwise direction about the shaft 31.

Therefore, the idle gear, which gears into the up/down gear 9 and has been placed on the position 11, moves in the leftward direction of FIG. 6A to reach the position 11'. The idle gear 11' completely gears into the take-up reel 3.

At this time, the idle gear 11 does not rotate the take-up reel 3.

When the elements of the deck mechanism completely achieve, by the rotational force of the loading motor, their positions for carrying out the desired REV-SLOW mode, the capstan shaft 4 is rotated counterclockwise to make the tape T run in the direction of the arrow B of FIG. 1. At this time, the idle gear 11, has been separated from the supply reel 2 but gears into the take-up reel 3 to rotate this reel 3 for taking up the tape T, thus to cause no problem in supplying of the tape T by the supply reel 2.

In the present invention, the turning member 41 cooperating with the function plate 18' linearly reciprocating by the rotational force of the loading motor, may directly rotate the upper clutch gear 33 of the clutch assembly 10 instead of the operating gear 38. In this case, the operating gear 38 may be omitted from the construction of the idler drive device of this invention.

In the above description, the idler drive device of this invention has been disclosed to be adapted for use with a deck mechanism of a VCR having a jog shuttle function. However, the idler drive device of this invention may be adapted for use with an apparatus, having a function for a frame movement in the "CUE→REV" direction or in the "REV→CUE" direction, without affecting the functioning of this invention.

As described above, an idler drive device of a VCR deck mechanism of the present invention uses an additional force other than the rotational force of a capstan motor to drive an idle gear. This additional force is not used in rotation of reels, or a tape supply reel and a tape take-up reel. That additional force acts on a section of the deck mechanism such as near a clutch assembly where a slip can be generated, thus to provide an advantage that no bad effect caused by the additional force is imparted on the capstan motor. In addition, the present invention achieves the desired jog shuttle function by a simpler structure than the known VCR deck mechanism, thus reducing the manufacturing cost of the deck mechanism.

In accordance with the idler drive device of the present invention, the elements of the deck mechanism achieve, using the rotational force of the loading motor, their locations for performing a desired mode prior to performance of the desired mode carried out by the rotational force of the capstan motor. In this regard, the timing for running of the tape by a rotation of the capstan shaft coincides with the timing for rotating either of the supply reel and the take-up reel using the rotational force of the capstan shaft. In addition, the idle gear of the drive device of this invention is completely separated from one of the reels and completely cooperates with the other reel even in the case of continuous repeat of the "CUE→REV" operation and the "REV→CUE" operation and, at the same time, the additional force does not forcibly rotate any one of the reels. Thus; a desired tensile force of the tape is maintained and this results in prevention of faults caused by increase of the tensile force of the tape, such as a picture noise, a sound noise and damage of the tape which results in deterioration of the picture quality.

The turning member of the idler drive device of this invention is a molding product having an L-shaped profile which is provided at an end thereof with a gear section gearing into the operating gear and at its linear section with a longitudinal guide slit having a predetermined length. This guide slit slidably receives a connection pin which is provided at a portion of the function plate such that the pin slides along the guide slit. Thus, the mold spring effect of the turning lever causes, in cooperation with an angle defined between the gear section and the linear section of the turning member, the operating gear to be rotated by a predetermined force. The above intrinsic profile of the turning member imparts no spatial restriction upon the function plate and allows the turning member to achieve its location by itself.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for driving an idler of a deck mechanism of a video cassette recorder comprising:

a tape supply reel and a tape take-up reel, both reels being rotatably mounted on a base plate of the deck mechanism;

a gear pulley applied with a rotational force of a capstan shaft through a belt;

a forward/reverse gear driven by said gear pulley, said forward/reverse gear driving the idler by a rotational force of said forward/reverse gear, the idler driving either said tape take-up reel or said tape supply reel; and a function member linearly reciprocating by a rotational force of a loading motor prior to transmission of the rotational force of said capstan shaft to said forward/reverse gear so as to selectively move the idler to drive said tape take-up reel or said tape supply reel, wherein said function member operates a turning member, said turning member having a gear section at a side thereof that meshes with and turns an operating gear, said operating gear being coupled with an upper clutch gear, said upper clutch gear meshing with an up/down gear, said up/down gear selectively gearing to move the idler depending on a direction of movement of said function member.

2. The device according to claim 1, wherein said function member includes a connection pin, and the turning member has a configuration defining a guide slit, said connection pin sliding in the guide slit of the turning member.

3. The device according to claim 2, wherein a configuration of the turning member is an L-shape.

4. The device according to claim 1, wherein the turning member has a configuration of an L-shape.

5. The device according to claim 1, wherein a linear movement of said function member in a first direction causes the operating gear and the upper clutch gear to rotate in a counter-clockwise direction.

6. The device according to claim 5, wherein the linear movement of said function member in a second direction causes the operating gear and the upper clutch gear to rotate in a clockwise direction.

7. The device according to claim 1 further comprising:

a clutch assembly including:

a lower clutch gear applied with the rotational force of said gear pulley for gearing with said forward/reverse gear; and said upper clutch gear causing said idler to gear into a connection gear for driving said tape supply reel or said tape take-up reel, wherein said operating gear is fixedly coupled to said upper clutch gear of said clutch assembly.

8. The device according to claim 7, wherein said operating gear is downwardly biased by a compression coil spring interposed between a lower surface of said clutch assembly and an upper surface of said operating gear.

* * * * *